United States Patent
Miura et al.

(10) Patent No.: US 6,816,771 B2
(45) Date of Patent: Nov. 9, 2004

(54) INTAKE AIR CONTROL SYSTEM AND METHOD FOR AN INTERNAL COMBUSTION ENGINE

(75) Inventors: Manabu Miura, Kanagawa (JP); Hiroyuki Aizawa, Yokohama (JP); Takashi Shirakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/392,908

(22) Filed: Mar. 21, 2003

(65) Prior Publication Data

US 2003/0188712 A1 Oct. 9, 2003

(30) Foreign Application Priority Data

Mar. 29, 2002 (JP) .......................................... 2002-095885

(51) Int. Cl.⁷ .............................................. G06F 19/00
(52) U.S. Cl. ...................... 701/102; 701/108; 123/399; 123/361; 123/90.15; 123/305; 123/568.12
(58) Field of Search ................................. 701/102, 103, 701/108; 123/305, 399, 316, 90.15–90.18, 568.12, 568.21, 564

(56) References Cited

U.S. PATENT DOCUMENTS 6,155,240 A * 12/2000 Amano et al. .......... 123/568.28

| | | | | |
|---|---|---|---|---|
| 6,397,807 B1 * | 6/2002 | Suzuki | ................. | 123/142.5 R |
| 6,571,765 B2 * | 6/2003 | Kuboshima et al. | ........ | 123/305 |
| 2003/0037748 A1 * | 2/2003 | Kawai et al. | ............ | 123/179.4 |

FOREIGN PATENT DOCUMENTS

JP              2-5898 B2       2/1990

* cited by examiner

*Primary Examiner*—Willis R. Wolfe
*Assistant Examiner*—Johnny H. Hoang
(74) *Attorney, Agent, or Firm*—Foley & Lardner LLP

(57) ABSTRACT

An intake air control system for an internal combustion engine is provided which comprises an intake throttle valve that controls an intake air quantity of air flowing into the engine, an EGR valve that controls a quantity of exhaust gas recirculated back to a portion of an intake system of the engine downstream of the intake throttle valve, and a control unit that controls the intake throttle valve and the EGR valve in accordance with an operating condition of the engine. The control unit includes a target opening area calculating section that calculates a target opening area of the intake throttle valve based on a target EGR ratio corresponding to the operating condition of the engine, and a control section that controls an opening degree of the intake throttle valve based on the target opening area. An intake air control method is also provided.

19 Claims, 9 Drawing Sheets

CONDITION: TARGET EXCESS AIR FACTOR IS CONSTANT

INTAKE AIR CONTROL SYSTEM AND METHOD FOR AN INTERNAL COMBUSTION ENGINE

BACKGROUND OF THE INVENTION

The present invention relates to an intake air control system and method for an internal combustion engine.

An example of an intake throttle valve control system for an internal combustion engine that controls an opening degree of an intake throttle valve by a feedback of an intake air quantity so that an actual intake air quantity becomes equal to a target intake air quantity is disclosed in Japanese Patent Second Publication (after examined) No. 2-5898.

A variation of an EGR quantity causes a variation of a pressure differential across an intake throttle valve. Thus, if the opening degree of the intake throttle valve is constant, a variation of the EGR quantity causes the actual intake air quantity to vary relative to the target intake air quantity. The earlier technology disclosed in the above described publication can control the opening degree of the intake throttle valve according to a variation of the actual intake air quantity relative to the target intake air quantity, so that the actual intake air quantity becomes equal to the target intake air quantity after lapse of a certain time.

SUMMARY OF THE INVENTION

However, by the above-described earlier technology, the feedback control of the intake air quantity is not executed unless the actual intake air quantity becomes different from the target intake air quantity, thus causing a problem that immediately after a variation of the EGR quantity the actual intake air quantity is always caused to deviate from the target intake air quantity.

It is accordingly an object of the present invention to provide an intake air control system and method for an internal combustion engine that can executes a highly accurate intake air quantity control while executing an EGR control.

To achieve the above object, there is provided according to an aspect of the present invention an intake air control system for an internal combustion engine comprising an intake throttle valve that controls an intake air quantity of air flowing into the engine, an EGR valve that controls a quantity of exhaust gas recirculated back to an intake system portion of the engine downstream of the intake throttle valve, and a control unit that controls the intake throttle valve and the EGR valve in accordance with an operating condition of the engine, the control unit including a target opening area calculating section that calculates a target opening area of the intake throttle valve based on a target EGR ratio corresponding to the operating condition of the engine, and a control section that controls an opening degree of the intake throttle valve based on the target opening area.

According to another aspect of the present invention, there is provided an intake air control system for an internal combustion engine comprising an intake throttle valve that controls an intake air quantity of air flowing into the engine, an EGR valve that controls a quantity of exhaust gas recirculated back to an intake system portion of the engine downstream of the intake throttle valve, calculating means for calculating a target opening area of the intake throttle valve based on a target EGR ratio corresponding to the operating condition of the engine, and control means for controlling an opening degree of the intake throttle valve based on the target opening area.

According to a further aspect of the present invention, there is provided an intake air control method for an internal combustion engine having an intake throttle valve that controls an intake air quantity of air flowing into the engine, and an EGR valve that controls a quantity of exhaust gas recirculated back to an intake system portion of the engine downstream of the intake throttle valve, the method comprising calculating a target opening area of the intake throttle valve based on a target EGR ratio corresponding to an operating condition of the engine, and controlling an opening degree of the intake throttle valve based on the target opening area.

DESCRIPTION OF THE PREFERRED EMBODIMENT

Figure 1:
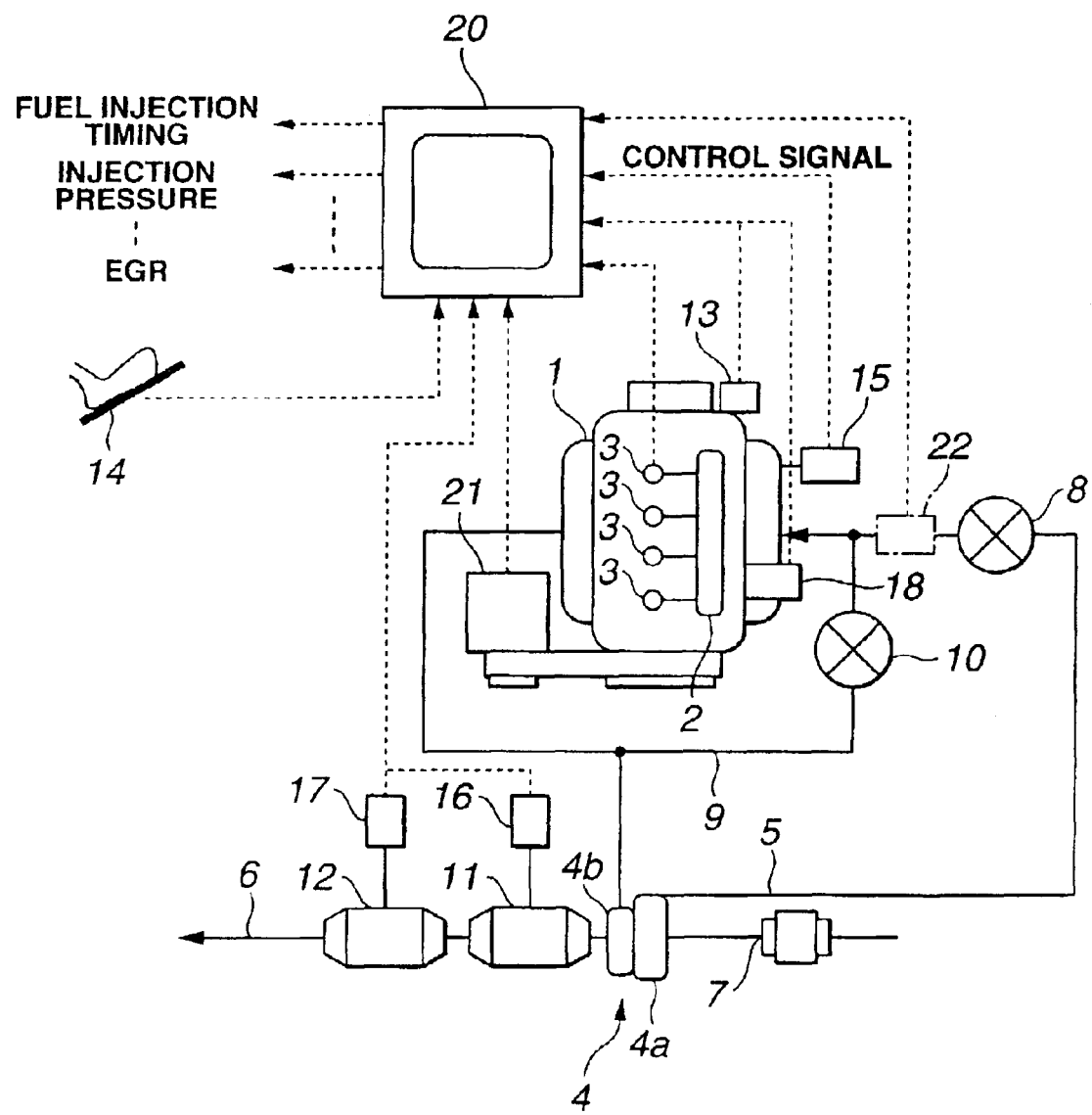
FIG. 1 is a diagrammatic view of an internal combustion engine on which an intake air control system according to an embodiment of the present invention is installed.

Referring first to FIG. 1, an intake air control system according to an embodiment of the present invention is installed on an internal combustion engine (diesel engine with a super charger) 1.

As shown, engine 1 is provided with a common rail fuel injection system including common rail 2, fuel injection valves 3, and a fuel pump (not shown) so as to be supplied with pressurized fuel. Fuel injection valves 3 inject fuel directly into respective combustion chambers (not shown).

Compressor 4a of super charger 4 is connected to intake passage 6 and is driven to supply compressed air to engine 1.

Turbine 4b of supper charger 4 is connected to exhaust passage 6 and is rotated by the exhaust gas emitted from engine 1 so as to drive compressor 4a.

In the meantime, super charger 4 used in this embodiment is of the variable volume type. Thus, by making smaller the opening area of a variable nozzle provided on the turbine 4b side, thereby making the turbine efficiency higher in the low speed range and by making larger the opening area of the variable nozzle, thereby increasing the turbine capacity, a high supper charging effect can be obtained over a wide engine operating range.

Intake passage 5 is provided with airflow meter 7 disposed on the upstream side of compressor 4a of super charger 4 and intake throttle valve 8.

Intake throttle valve 8 is, for example, of the electronically controlled type and is capable of varying an opening degree by using a step motor. Depending upon the opening degree is controlled a quantity of intake air flowing into engine 1.

Exhaust passage 6 is provided with EGR passage 9 branching off from an exhaust passage portion between engine 1 and turbine 4b of supper charger 4 and connected to intake passage 5, EGR valve 10 provided to EGR passage 9, NOx trap catalyst 11 disposed on the downstream side of turbine 4b of supper charger 4, and particulate filter (filter for collecting exhaust particulates) 12.

EGR valve 10 is, for example, of the electronically controlled type using a step motor and controls the EGR quantity, i.e., the quantity of exhaust gas drawn to engine 1.

NOx trap catalyst 11 traps NOx contained in the exhaust gas and purifies it by reduction, and particulate filter 12 collects exhaust particulates and thereby purifies the exhaust gas.

For detecting various states are provided various sensors such as, in addition to airflow meter 7 for detecting intake air quantity Qa, engine speed sensor 13 for detecting engine speed Ne, accelerator opening degree sensor 14 for detecting an accelerator opening degree, coolant temperature sensor 15 for detecting a coolant temperature, thermocouples 16, 17 for detecting the temperature of NOx trap catalyst 11 and the temperature of oxidation catalyst 12 with a HC adsorptive function, respectively, and rail pressure sensor 18 for detecting the fuel pressure within common rail 2 (i.e., fuel injection pressure).

Control unit 20 determines the fuel injection quantity Qf and injection timing IT, controls the drive of fuel injection valve 3 and controls the opening degree of intake throttle valve 8 and EGR valve 10 in response to detection signals from the above described various sensors and signals from engine accessories such as accessory 21.

Namely, the excess air factor is controlled by intake throttle valve 8 and EGR valve 10 for a temperature rise and regeneration of particulate filter 12 or at the time of rich operation for desorbing NOx and thereby purifying NOx trap catalyst 11 or at the time of operation on a theoretical air-fuel ratio (i.e. stoichiometric air-fuel ratio) at which release from sulfur-poisoning is required.

Figure 2:
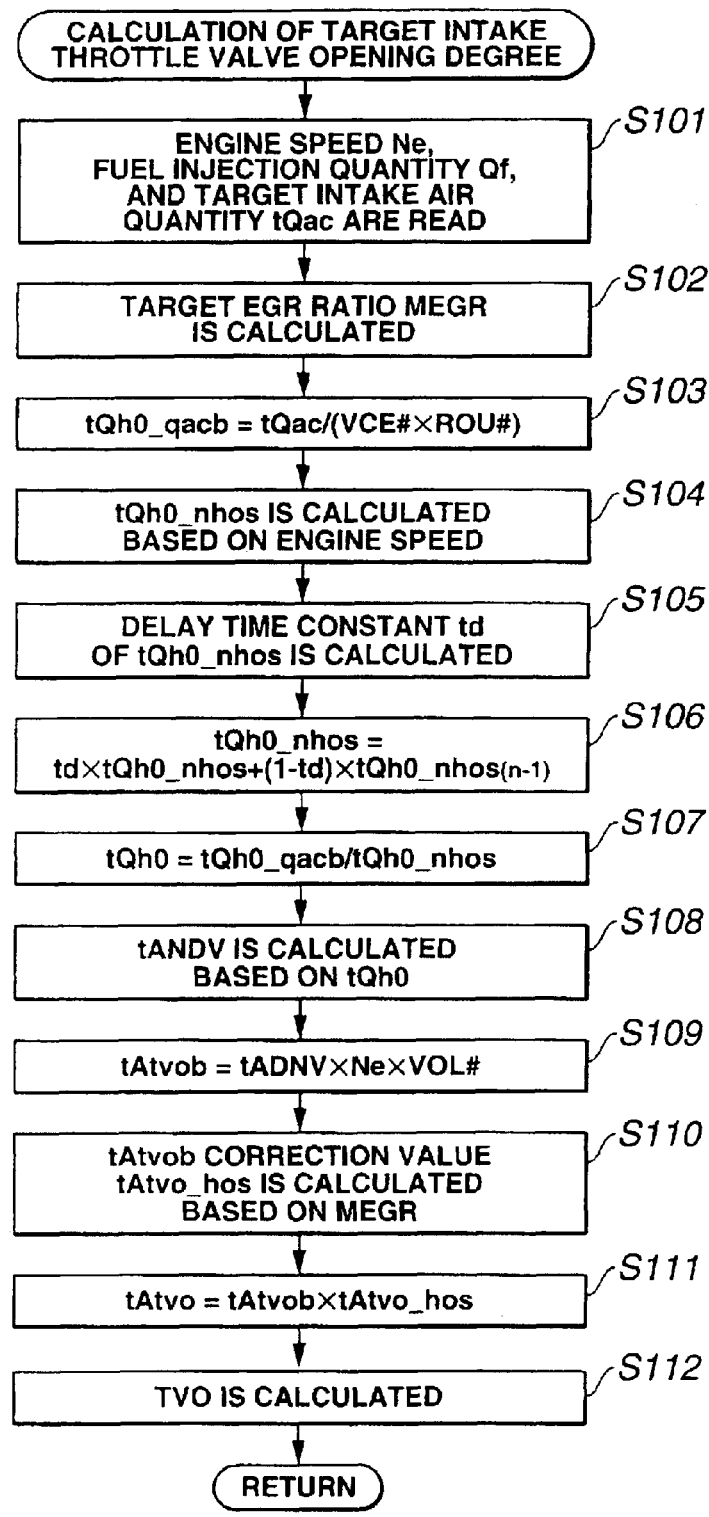
FIG. 2 is a flowchart of a routine for calculating a target intake throttle valve opening degree.
Figure 3:
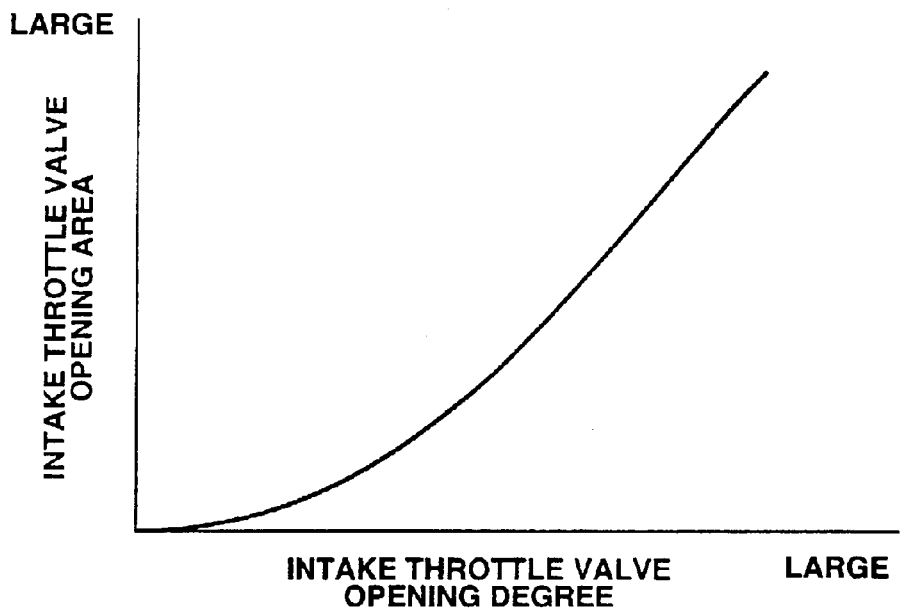
FIG. 3 is a diagram showing a relation between an intake throttle valve opening degree and an intake throttle valve opening area.
Figure 4:
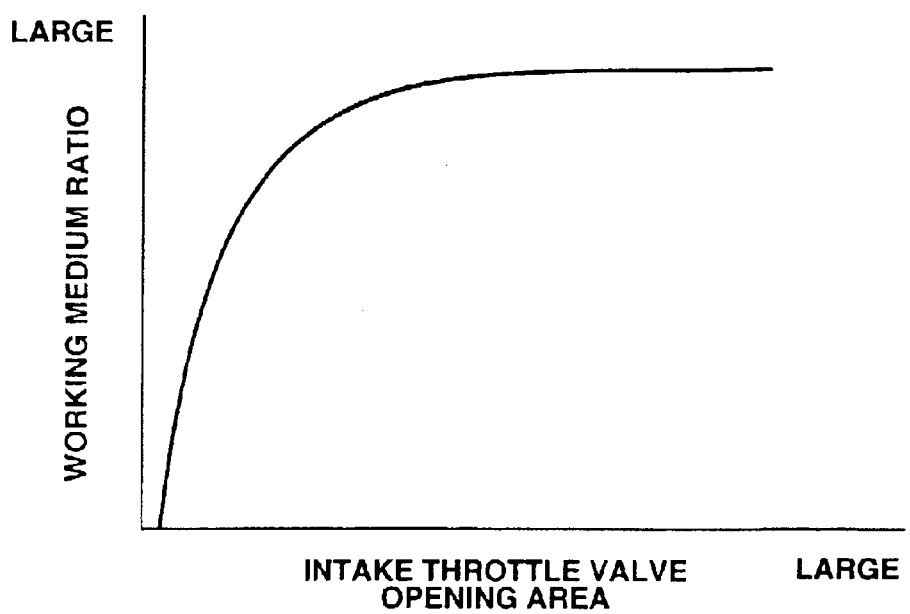
FIG. 4 is a diagram showing a relation between an intake throttle valve opening area and a working medium ratio.

Referring to the flowchart of FIG. 2, the control of the intake throttle valve at the time of the above described excess air factor control according to the present invention will be described.

In step S101, an engine speed Ne, fuel injection quantity Qf and target intake air quantity tQac are read.

Figure 8:
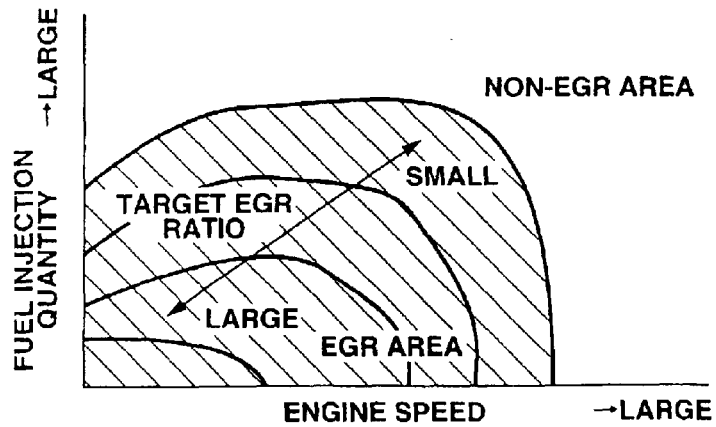
FIG. 8 is a map for calculation of a target EGR.

In step S102, by using, for example, a map shown in FIG. 8, a target EGR ratio MEGR is calculated In step S103, the basic working medium ratio tQh0_qacb is calculated from a target intake air quantity tQac and an exhaust gas quantity VCE# per one cylinder in the following manner.

$$tQh0\_qacb = tQac/(VCE\# \times ROU\#)$$

Figure 10:
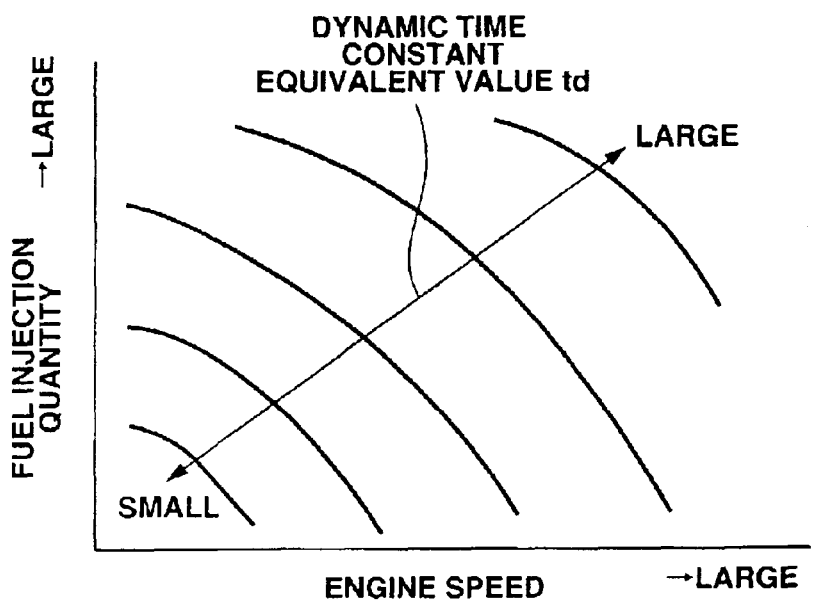
FIG. 10 is a map for calculation of a dynamic time constant equivalent value td.

In step S104, by using, for example, a map shown in FIG. 10, a dynamic time constant equivalent value td used for a delay process of a working medium ratio tQh0.

In step S106, the working medium correction coefficient tQh0_nhos that was calculated in step S104 is treated by a delay process by using the dynamic time constant equivalent value td.

In step S107, a target working medium ratio tQh0 is calculated by dividing the basic working medium ratio tQh0_qacb that was calculated in step S103 by the working medium correction coefficient tQh0_nhos that was calculated and treated by the delay process in step S106.

Figure 11:
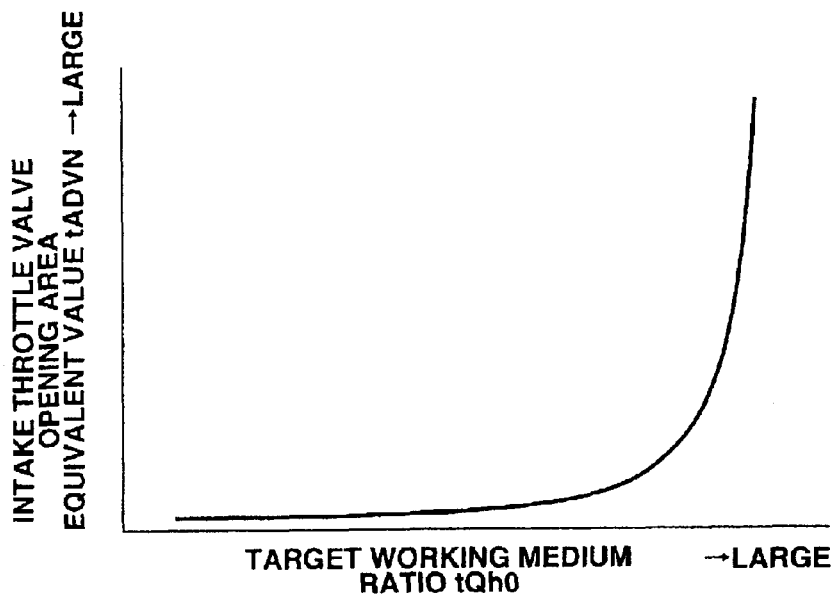
FIG. 11 is a table for calculation of an intake throttle valve opening area equivalent value tADNV.

In step S108, by using, for example, a table shown in FIG. 11, an intake throttle opening area equivalent value tADNV per a unit engine rotation and a unit displacement is calculated from the target working medium ratio tQh0 that was calculated in step S107.

In step S109, an intake throttle valve basic opening area tAtvob is calculated from the opening area equivalent value tADNV that was calculated in step S108, the engine speed Ne and a total displacement VOL# (=VCE#×the number of cylinders) in the following manner.

$$tAtvob = tADNV \times Ne \times VOL\#$$

Figure 12:
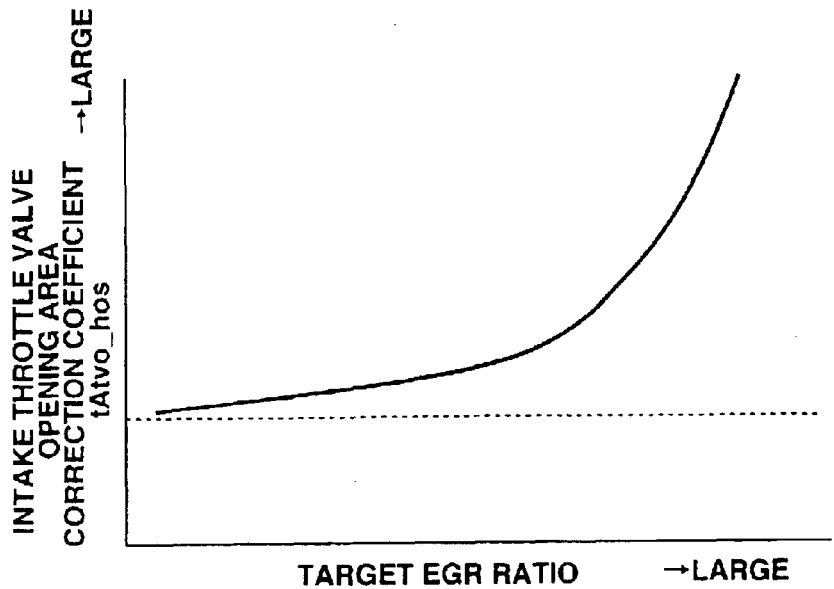
FIG. 12 is a table for calculation of an intake throttle valve opening area correction coefficient tAtvo__hos.

In step S110, by using, for example, a table shown in FIG. 12, an intake throttle valve opening area correction coefficient tAtvo_hos is calculated from the target EGR ratio MEGR.

In step S111, a final target intake throttle valve opening area tAtvo is calculated by multiplying the basic opening area tAtvob that was calculated in step S109 by the opening area correction coefficient tAtvo_hos that was calculated in step S110 in the following manner.

$$tAtvo = tAtvob \times tAtvo\_hos$$

Figure 13:
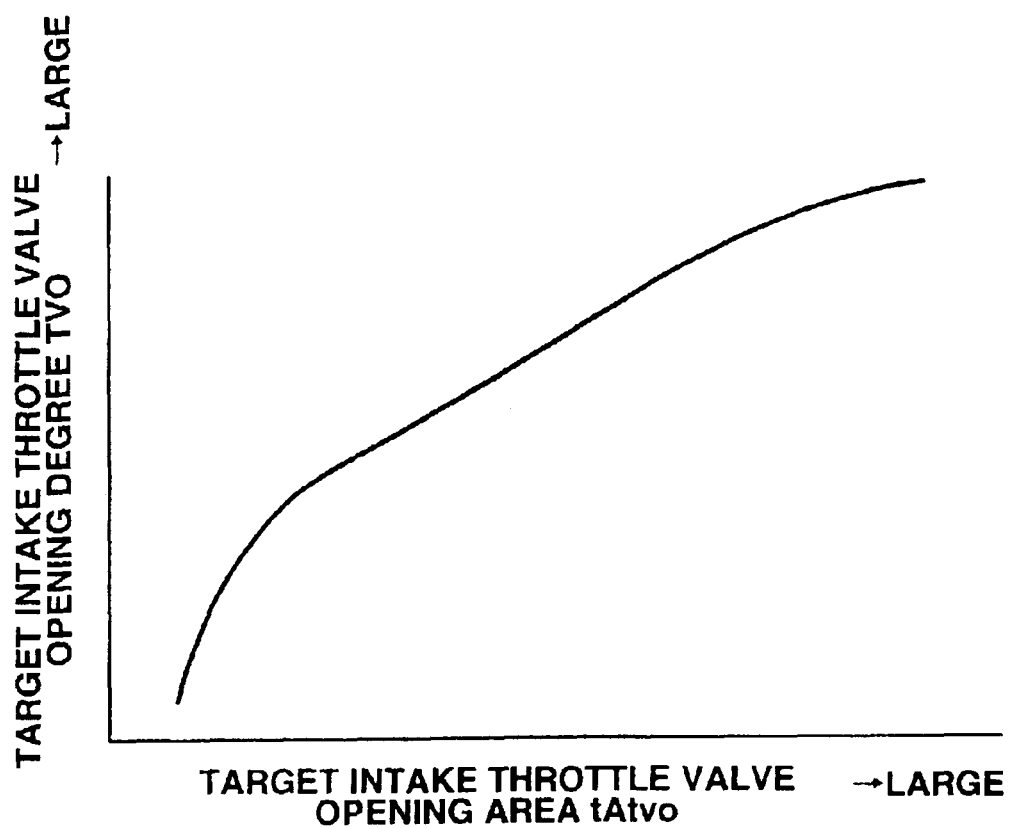
FIG. 13 is a table for calculation of a target intake throttle valve opening degree TVO.
Figure 14A:
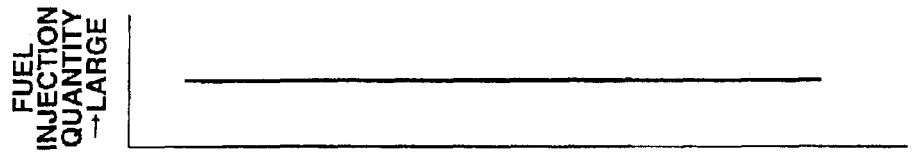
FIGS. 14A to 14E are diagrams for showing motions of various elements in the invention.
Figure 14B:
Figure 14C:
Figure 14D:
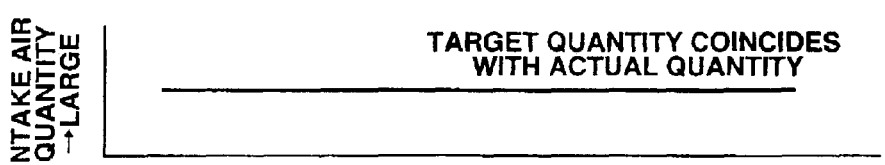
Figure 14E:
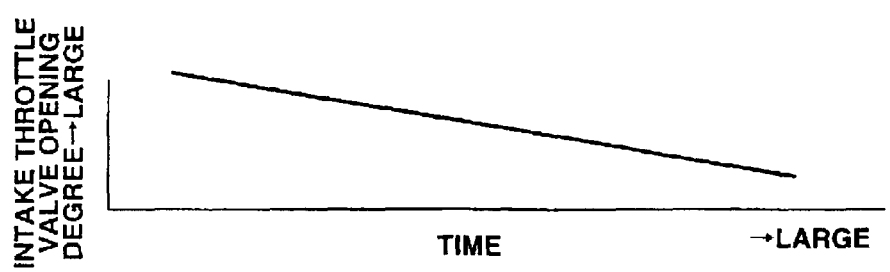

In step S112, by using, for example, an opening area-opening degree conversion table shown in FIG. 13, a throttle valve target opening degree TVO is calculated.

Intake throttle valve 8 is controlled so as to attain the target opening degree TVO.

The motions of various elements at the time of control according to the present invention under a condition where the target excess air factor is constant.

By correcting the opening area of throttle valve 8 in consideration of a variation of EGR ratio caused in accordance with increase of the engine speed, the intake throttle valve opening degree is corrected in response to a variation of the EGR ratio, thereby enabling the intake air quantity to become equal to the target value. By this, at the time of transitional engine operation where the EGR ratio is varied, the excess air factor can be maintained constant while holding the fuel injection quantity constant, thus making it possible to attain a good engine performance and a good exhaust gas purification ability.

Figure 9:
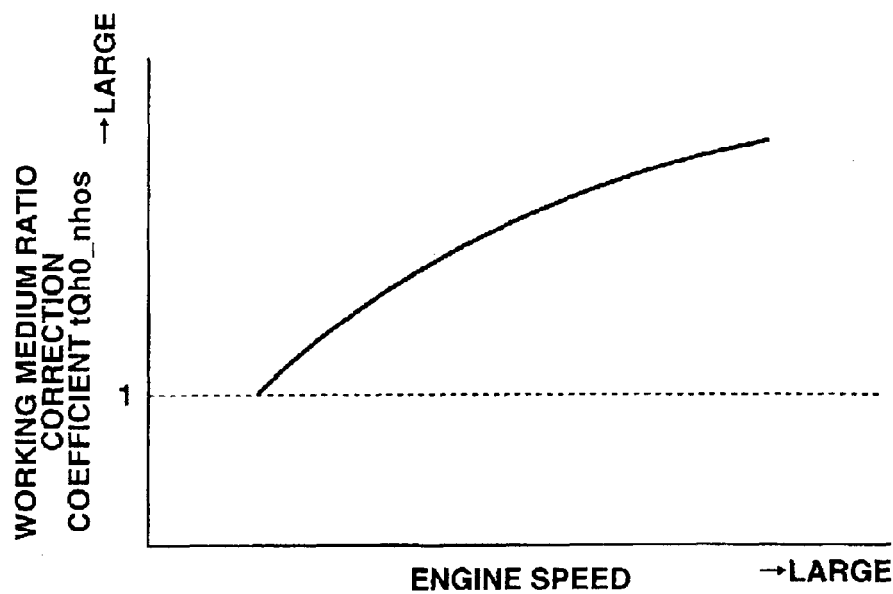
FIG. 9 is a table for calculation of a working medium ratio correction coefficient tQh0__nhos.

From the foregoing, it will be understood that the intake air control system of the present invention comprises a calculating means (constituted by control unit 20, the flowchart in FIG. 2, and maps and tables in FIGS. 8 to 13) for calculating a target opening area of the intake throttle valve 8 based on a target EGR ratio corresponding to the operating condition of the engine 1, and a control means (constituted by control unit 20) for controlling an opening degree of the intake throttle valve 8 based on the target opening area. In other words, the intake air control system of the present invention comprises the control unit 20 that controls the intake throttle valve 8 and the EGR valve 10 in accordance with an operating condition of the engine. The control unit 20 includes a target opening area calculating section (i.e., flowchart in FIG. 2 and maps and tables in FIGS. 8 to 9) that calculates a target opening area of the intake throttle valve 8 based on a target EGR ratio corresponding to the operating condition of the engine 1, and a control section that controls an opening degree of the intake throttle valve 8 based on the target opening area. In this connection, the EGR ratio has an influence on the pressure differential across the intake throttle valve. Namely, the intake air quantity varies depending upon a variation of the EGR ratio if the opening degree of the intake throttle valve 8 is the same. Thus, by calculating the target opening area of the intake throttle valve 8 based on the target EGR ratio in consideration of the EGR ratio that influences the pressure differential across the intake throttle valve 8 and controlling the opening degree based on the target opening area, the excess air factor can be controlled so as to become equal to a target value.

It will be further understood that the larger the target EGR ratio becomes, the larger target opening area results. In this connection, the larger the EGR ratio, the larger the EGR quantity flowing into an intake system portion downstream of the intake throttle valve becomes, thereby reducing the pressure differential across the intake throttle valve. Thus, by increasing the target opening area of the intake throttle valve, the necessary intake air quantity can be obtained.

It will be further understood that the target opening area increases at a rate that increases with increase of the target EGR ratio. In this connection, even if the intake throttle valve opening area is varied by a predetermined amount, a resulting variation of the intake air quantity when the target EGR ratio is larger (the opening area of the EGR valve is larger) is smaller than that when the target EGR ratio is smaller (the opening area of the EGR valve is smaller) since the pressure differential across the intake throttle valve is smaller when the target EGR ratio is larger. Thus, by determining the rate at which the target opening area becomes larger so as to increase with increase of the target EGR ratio, a highly accurate intake air quantity can be obtained in response to a variation of the target EGR ratio.

It will be further understood that the target opening area calculating section comprises a basic opening area calculating section (S101 to S109 of FIG. 2) that calculates a basic opening area of the intake throttle valve 8 based on a target intake air quantity corresponding to the operating condition of the engine 1, and an opening area correction coefficient calculating section (S110 and S111 of FIG. 2) that calculates an opening area correction coefficient based on the target EGR ratio corresponding to the operating condition of the engine 1, the target opening area being the result obtained by multiplying the basic opening area by the opening area correction coefficient. In this connection, the basic opening area of the intake throttle valve 8 that can attain the target intake air quantity without consideration of the EGR ratio, i.e., in case EGR is not performed is first calculated, and then the basic opening area is corrected by the opening area correction coefficient that is calculated based on the target EGR ratio, in consideration of the influence of the EGR ratio. By executing calculations dividedly with respect to the parameters to be considered in the above-described manner, it becomes possible to execute the calculations with ease and with a high accuracy.

It will be further understood that the basic opening area calculating section comprises a basic working medium ratio calculating section (S103 of FIG. 2) that calculates a basic working medium ratio that is the result obtained by dividing the target intake air quantity by a maximum intake air quantity at the time the intake throttle valve 8 is fully open, and calculates the basic opening area based on the basic working medium ratio. In this connection, in case the basic opening area is determined without consideration of EGR, the intake air quantity caused by the same opening degree of the intake throttle valve (including the maximum intake air quantity corresponding to the maximum opening degree) varies depending upon a variation of the operating condition of the engine 1. Thus, an accurate basic opening area cannot be obtained directly from the target intake air quantity. In contrast to this, by determining the basic opening area so that the same basic working medium ratio is obtained, the working medium ratio being the ratio of the target intake air quantity to the maximum intake air quantity, an accurate target intake air quantity can be obtained even in case a different intake air quantity is caused by the same opening degree of the intake throttle valve (under the condition where EGR is not performed). Thus, by calculating the basic working medium ratio and calculating the basic opening area based on the basic working medium ratio, the basic opening area can be calculated highly accurately.

Figure 5:
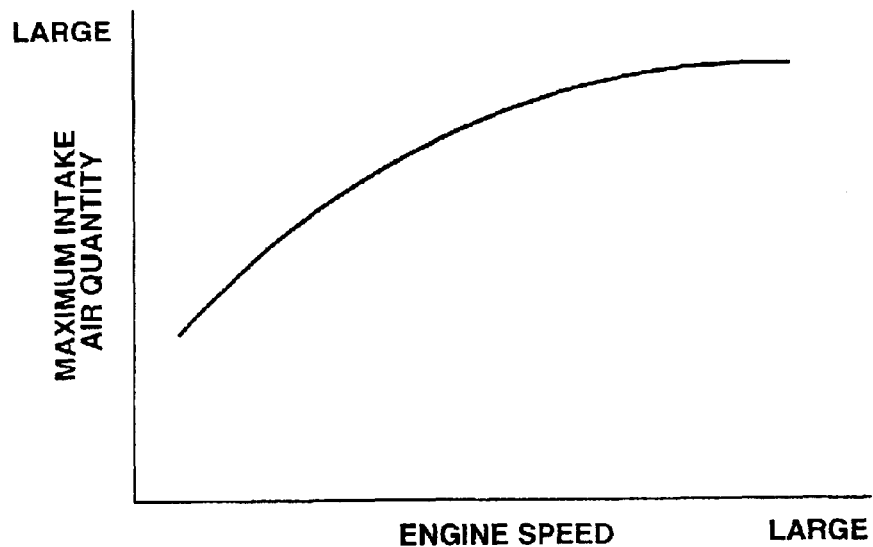
FIG. 5 is a diagram showing a relation between an engine speed and a maximum intake air quantity.

It will be further understood that the basic opening area calculating section comprises a working medium ratio correction coefficient calculating section (S104 to S106 of FIG. 2) that calculates a working medium correction coefficient based on an engine speed, and calculates the basic opening area based on the basic working medium ratio and the working medium ratio correction coefficient. In this connection, as shown in FIG. 5, the maximum intake air quantity varies depending upon a variation of the engine speed. Thus, by correcting the basic working medium ratio by means of the working medium correction coefficient that is calculated based on the engine speed, the basic opening area can be calculated highly accurately in consideration of the influence of the engine speed and therefore the intake air quantity can be controlled accurately over all the engine operating range.

Figure 6:
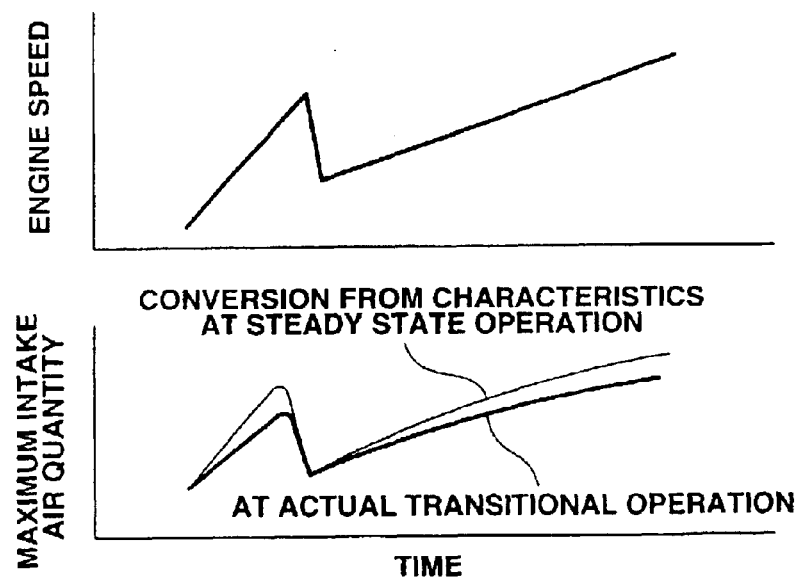
FIG. 6 is a time chart showing a variation of a maximum intake air quantity at transitional engine operation.

It will be further understood that the working medium ratio correction coefficient calculating section comprises a delay process section (S105 and S106 of FIG. 2) that treats the working medium correction coefficient. In this connection, as shown in FIG. 6, a variation of the engine speed (at transitional operation of the engine) causes a delay or lag in attainment of the maximum intake air quantity. Thus, by treating the working medium ratio correction coefficient by a delay process, a working medium correction coefficient that is determined in consideration of the delay in attainment of the maximum intake air quantity at transitional operation of the engine can be obtained, thus making it possible to control the intake air quantity at transitional operation of the engine highly accurately.

Figure 7:
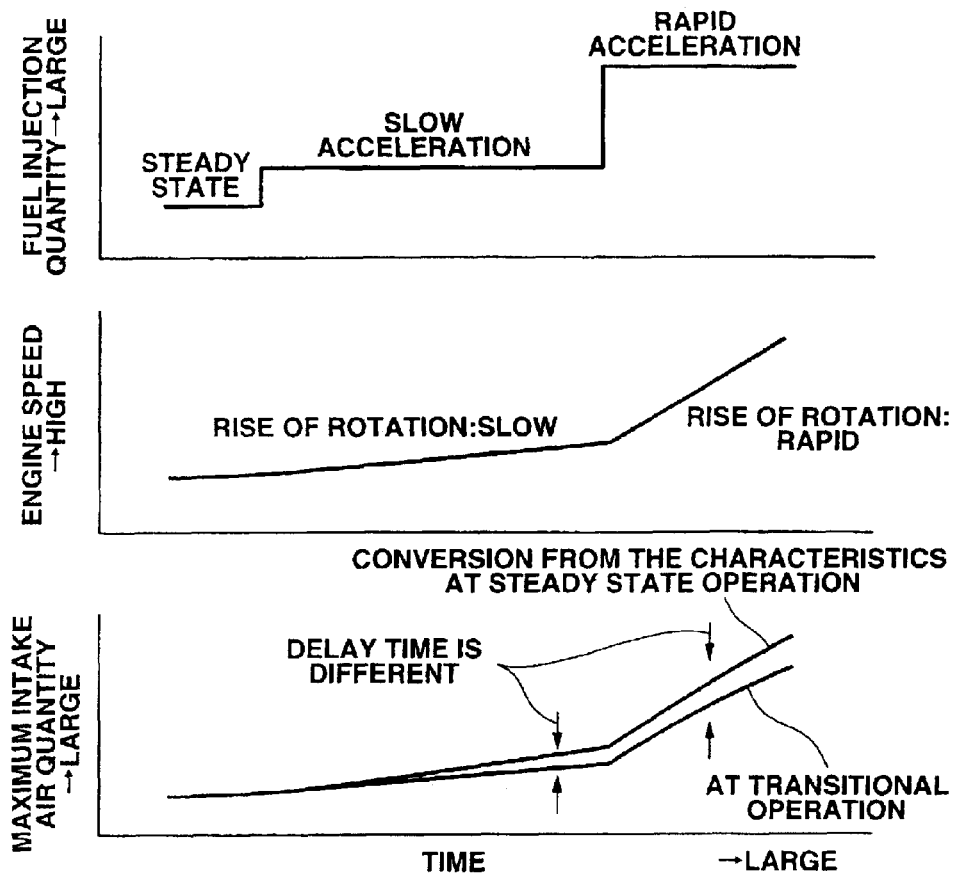
FIG. 7 is a time chart showing a variation of a maximum intake air quantity in response to a variation of engine rotation rising speed.

It will be further understood that the working medium ratio correction coefficient calculating section calculates a time constant of the delay process section based on the engine speed and a fuel injection quantity. In this connection, as shown in FIG. 7, in case of a variation of the engine speed (at transitional operation of the engine), a delay in attainment of the intake air quantity varies (i.e., time constant varies) depending upon a variation of the operating condition of the engine 1. Thus, by treating the working medium ratio correction coefficient by a delay process that varies depending upon a variation of the operating condition of the engine 1, the working medium correction coefficient can be calculated more accurately.

It will be further understood that a value equivalent to an intake pressure downstream of the intake throttle valve is used as the basic working medium ratio. In this connection, there is a correlation between the intake pressure downstream of the intake throttle valve and the working medium ratio. Since the working medium ratio equivalent value can be detected from the intake pressure by using an intake pressure sensor, the basic working medium ratio can be calculated with ease. Further, a variation of the working medium ratio due to a variation of the maximum intake air quantity that is caused by deterioration with age can be compensated for.

The entire contents of Japanese Patent Applications P2002-095885 (filed Mar. 29, 2002) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, the basic working medium ratio tQh0_qacb can be calculated so as to be equated to an intake pressure detected by intake pressure sensor 22 that is disposed downstream of intake throttle valve 8 as indicated by one-dot chain line in FIG. 1. The scope of the invention is defined with reference to the following claims.

What is claimed is:

1. An intake air control system for an internal combustion engine comprising:
    an intake throttle valve that controls an intake air quantity of air flowing into the engine;
    an EGR valve that controls a quantity of exhaust gas recirculated back to an intake system portion of the engine downstream of the intake throttle valve; and
    a control unit that controls the intake throttle valve and the EGR valve in accordance with an operating condition of the engine;
    the control unit including:
        a target opening area calculating section that calculates a target opening area of the intake throttle valve based on a target EGR ratio corresponding to the operating condition of the engine; and
        a control section that controls an opening degree of the intake throttle valve based on the target opening area.

2. An intake air control system according to claim 1, wherein the larger the target EGR ratio becomes, the larger the target opening area becomes.

3. An intake air control system according to claim 2, wherein the target opening area increases at a rate that increases with increase of the target EGR ratio.

4. An intake air control system according to claim 1, wherein the target opening area calculating section comprises:
    a basic opening area calculating section that calculates a basic opening area of the intake throttle valve based on a target intake air quantity corresponding to the operating condition of the engine; and
    an opening area correction coefficient calculating section that calculates an opening area correction coefficient based on the target EGR ratio corresponding to the operating condition of the engine;
    the target opening area being the result obtained by multiplying the basic opening area by the opening area correction coefficient.

5. An intake air control system according to claim 4, wherein the basic opening area calculating section comprises a basic working medium ratio calculating section that calculates a basic working medium ratio that is the result obtained by dividing the target intake air quantity by a maximum intake air quantity at the time the intake throttle valve is fully open, and calculates the basic opening area based on the basic working medium ratio.

6. An intake air control system according to claim 5, wherein the basic opening area calculating section comprises a working medium ratio correction coefficient calculating section that calculates a working medium correction coefficient based on an engine speed, and calculates the basic opening area based on the basic working medium ratio and the working medium ratio correction coefficient.

7. An intake air control system according to claim 6, wherein the working medium ratio correction coefficient calculating section comprises a delay process section that treats the working medium correction coefficient.

8. An intake air control system according to claim 6, wherein the working medium ratio correction coefficient calculating section calculates a time constant of the delay process based on the engine speed and a fuel injection quantity.

9. An intake air control system according to claim 5, wherein a value equivalent to an intake pressure downstream of the intake throttle valve is used as the basic working medium ratio.

10. An intake air control system for an internal combustion engine comprising:
    an intake throttle valve that controls an intake air quantity of air flowing into the engine;
    an EGR valve that controls a quantity of exhaust gas recirculated back to an intake system portion of the engine downstream of the intake throttle valve;
    calculating means for calculating a target opening area of the intake throttle valve based on a target EGR ratio corresponding to the operating condition of the engine; and
    control means for controlling an opening degree of the intake throttle valve based on the target opening area.

11. An intake air control method for an internal combustion engine having an intake throttle valve that controls an intake air quantity of air flowing into the engine, and an EGR valve that controls a quantity of exhaust gas recirculated back to an intake system portion of the engine downstream of the intake throttle valve, the method comprising:
    calculating a target opening area of the intake throttle valve based on a target EGR ratio corresponding to an operating condition of the engine; and
    controlling an opening degree of the intake throttle valve based on the target opening area.

12. An intake air control method according to claim 11, wherein the larger the target EGR ratio becomes, the larger the target opening area becomes.

13. Au intake air control method according to claim 12, wherein the target opening area increases at a rate that increases with increase of the target EGR ratio.

14. An intake air control method according to claim 11, wherein the calculating of the target opening area comprises:
    calculating a basic opening area of the intake throttle valve based on a target intake air quantity corresponding to the operating condition of the engine; and
    calculating an opening area correction coefficient based on the target EGR ratio corresponding to the operating condition of the engine;
    the target opening area being the result obtained by multiplying the basic opening area by the opening area correction coefficient.

15. An intake air control method according to claim 14, wherein the calculating of the basic opening area comprises calculating a basic working medium ratio that is the result obtained by dividing the target intake air quantity by a maximum intake air quantity at the time the intake throttle valve is fully open, and calculating the basic opening area based on the basic working medium ratio.

16. An intake air control method according to claim 15, wherein the calculating of the basic opening area comprises calculating a working medium correction coefficient based on an engine speed, and calculating the basic opening area based on the basic working medium ratio and the working medium ratio correction coefficient.

17. An intake air control method according to claim 16, wherein the calculating of the working medium ratio correction coefficient calculating section comprises treating the working medium correction coefficient by a delay process.

18. An intake air control system according to claim 16, wherein the calculating of the working medium ratio correction coefficient comprises calculating a time constant of the delay process based on the engine speed and a fuel injection quantity.

19. An intake air control method according to claim 15, wherein a value equivalent to an intake pressure downstream of the intake throttle valve is used as the basic working medium ratio.

* * * * *